US012585918B2

(12) United States Patent
Hatten

(10) Patent No.: US 12,585,918 B2
(45) Date of Patent: Mar. 24, 2026

(54) ML MODEL DRIFT DETECTION USING MODIFIED GAN

(71) Applicant: Raytheon Company, Arlington, VA (US)

(72) Inventor: Nicole M. Hatten, Allen, TX (US)

(73) Assignee: Raytheon Company, Arlington, VA (US)

( * ) Notice: Subject to any disclaimer, the term of this patent is extended or adjusted under 35 U.S.C. 154(b) by 728 days.

(21) Appl. No.: 17/971,187

(22) Filed: Oct. 21, 2022

(65) Prior Publication Data

US 2023/0126695 A1 Apr. 27, 2023

Related U.S. Application Data

(60) Provisional application No. 63/270,672, filed on Oct. 22, 2021.

(51) Int. Cl.
*G06N 3/045* (2023.01)
*G06N 3/048* (2023.01)

(52) U.S. Cl.
CPC ............. *G06N 3/045* (2023.01); *G06N 3/048* (2023.01)

(58) Field of Classification Search
CPC ...... G06N 3/045; G06N 3/048; G06N 3/0475; G06N 3/0464; G06N 3/084; G06N 3/094
See application file for complete search history.

(56) References Cited

U.S. PATENT DOCUMENTS 10,599,957 B2 * 3/2020 Walters .................. G06N 20/10
2022/0357729 A1 * 11/2022 Xu .......................... G06N 3/094

OTHER PUBLICATIONS

Suprem, ODIN: Automated Drift Detection and Recovery in Video Analytics, pp. 1-13, Sep. 9, 2020.*
Stackoverflow, Easiest way to see the output of a hidden layer in Tensorflow/Keras, pp. 1-3, Aug. 19, 2020.*
Alnujaim, Ibrahim, "Augmentation of Doppler Radar Data Using Generative Adversarial Network for Human Motion Analysis", Healthcare Informatics Research, 25(4), (Oct. 2019), 344-349.
Du, Chuan, "Conditional Prior Probabilistic Generative Model With Similarity Measurement for ISAR Imaging", IEEE Geoscience and Remote Sensing Letters, vol. 19. Article 4013205, (2022), 1-5.
Qin, Dan, "Enhancing ISAR Resolution by a Generative Adversarial Network", IEEE Geoscience and Remote Sensing Letters, vol. 18, No. 1, (Jan. 2021), 127-131.
Suprem, Abhijit, "ODIN: Automated Drift Detection and Recovery in Video Analytics", arXiv:2009.05440v1, (Sep. 2020), 13 pgs.

* cited by examiner

*Primary Examiner* — Albert M Phillips, III

(74) *Attorney, Agent, or Firm* — Schwegman Lundberg & Woessner, P.A.

(57) ABSTRACT

Discussed herein are devices, systems, and methods for machine learning (ML) model drift detection. A method can include receiving machine learning (ML) data defining a number of layers of neurons, a number of neurons per each layer, and weights for each neuron of a deployed ML model, operating the deployed ML model in a modified generative adversarial network (GAN) architecture, while operating the deployed ML model, recording output of a hidden layer of the deployed ML model, determining a metric of the output, and re-deploying the deployed ML model and monitoring whether the re-deployed ML model is suffering from ML model drift based on the metric.

15 Claims, 6 Drawing Sheets

REFERENCE DIAGRAM

REAL DATA
110

NOISE
108
102
GENERATOR
112
FAKE DATA
104
DISCRIMINATOR

FAKE DATA REAL/FAKE
120 REAL DATA & FAKE DATA
116
122 REAL/FAKE
114
ERROR
106
UPDATE
ERROR

UPDATE
118

REFERENCE DIAGRAM

300

104

DISCRIMINATOR

220

INPUT LAYER

NEW DATA
330

222

HIDDEN LAYER

224

HIDDEN LAYER

226

OUTPUT LAYER

CLASS
228

HIDDEN LAYER OUTPUT
230

METRIC
234

DRIFT ANALYZER

336

DRIFT/NO DRIFT
332

400

430 — RECEIVE ML DATA DEFINING DEPLOYED ML MODEL

432 — OPERATE THE DEPLOYED ML MODEL IN A MODIFIED GAN ARCHITECTURE

434 — RECORD OUTPUT OF HIDDEN LAYER OF DEPLOYED ML MODEL

436 — DETERMINE METRIC OF OUTPUT

438 — RE-DEPLOY THE DEPLOYED ML MODEL AND MONITOR DRIFT OF THE DEPLOYED ML MODEL BASED ON THE METRIC

ML MODEL DRIFT DETECTION USING MODIFIED GAN

RELATED APPLICATION

This application claims the benefit of priority to U.S. Provisional Patent Application 63/270,672, titled "ML Model Drift Detection Using Modified GAN", and filed on Oct. 22, 2021, which is incorporated herein by reference in its entirety.

TECHNICAL FIELD

Embodiments discussed herein regard devices, systems, and methods for identifying machine learning (ML) drift, compensating for identified ML drift, or a combination thereof.

BACKGROUND

An ML model can require a prohibitively large amount of training data for sufficiently accurate and robust operation. Many times, a training dataset is too sparse to train a ML model accurately for deployment as a robust object/target classifier. Furthermore, an additional complication for ML techniques includes "deterioration" of neural networks (NNs), also known as model drift. As data evolves, such as to reflect the environment it represents, the information required for maintaining a sufficiently robust NN will evolve and expand to continued robustness within the ML model. As a result, the requirement for newly evolved data will continuously exist for the essential robustness of the ML model.

DETAILED DESCRIPTION

Figure 1:
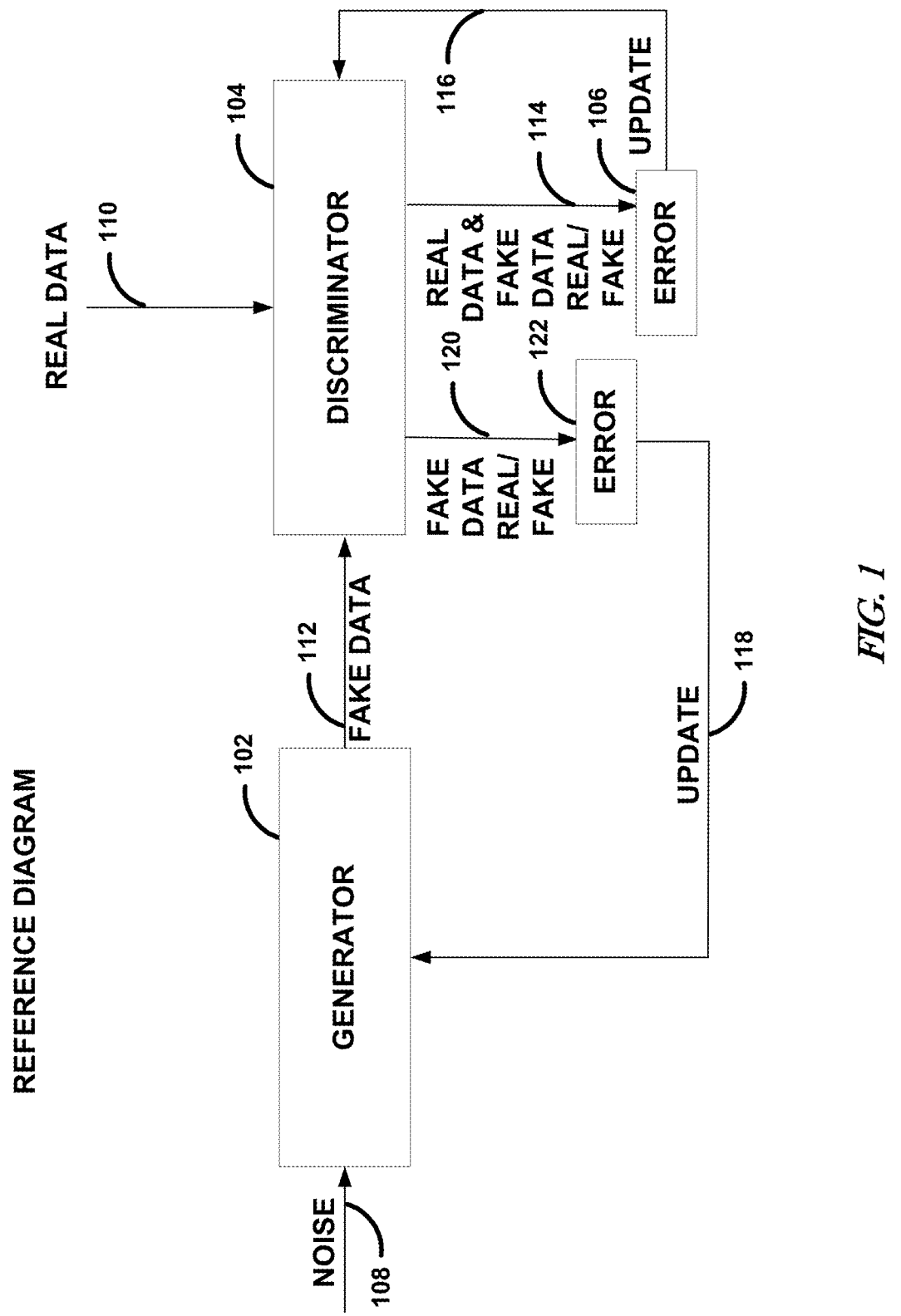
FIG. 1 illustrates, by way of example, a diagram of a GAN architecture.

FIG. 1 illustrates, by way of example, a diagram of a GAN architecture. The GAN architecture is well known and includes a generator network 102, a discriminator network 104, and an error propagator 106. The generator network 102 generates fake data 112 based on noise 108. The noise 108 can be processed to generate fake data 112 that includes features that are within the distribution of the training data of the discriminator network 104. A goal of the generator network 102 is to generate fake data 112 that is indistinguishable, to the discriminator network 104, from the real data 110. The real data 110 is actual data that is gathered and not synthetically generated. For example, the real data 110 can include images generated by a camera or other optical sensor, or the like. The real data 110 can include images, videos, audio, a text or multimedia file, a combination thereof, or the like.

A configuration of the generator network 102 can include a projection and reshaping operation, followed by a repetition of three consecutive layers including a transposed convolution, batch normalization, and a rectified linear unit (ReLU). The final hidden layer can perform another transposed convolution. The final layer can perform a hyperbolic tangent operation.

A configuration of the discriminator network 104 can include a dropout layer, hidden layers that include a convolution layer and a leaky ReLU, followed by a repetition of three consecutive layers including a convolution layer, batch normalization layer, and a leaky ReLU layer. A final layer of the discriminator network can include a convolution.

The discriminator network 104 receives the real data 110 and the fake data 112 and produces data 114 indicating whether the fake data 112 is real or fake and whether real data 110 is real or fake. The discriminator network 104 and the generator network 102 can be updated based on error determined by error propagators 106 and 122, respectively. An update 116 of the discriminator network 104 can be to better distinguish between the real data 110 and the fake data 112, while an update 118 of the generator network 102 can be to improve the fake data 112 so that the discriminator network 104 mistakes the fake data 112 for the real data 110 (as indicated by fake data real/fake 120, thus the "adversarial" in generative adversarial network. Embodiments can modify the GAN architecture and use a modified GAN architecture to determine whether the discriminator network 104 has experienced drift after deployment.

The GAN architecture, as shown in FIG. 1, can help address a problem of sparse datasets. There is often a discrepancy between data required to train a robust, accurate ML model and the amount of training data available. A transformed model of the FIG. 1 GAN architecture can provide an ability to identify ML model drift. The ML model drift can be identified per classification. As a result, ML model drift can become identified specifically to a level of classification. The ML model drift identification process provides clues as to a category or feature of the training data that was nonexistent or sparse at the time of training. Embodiments can use an architecture similar to that of the GAN, called a "modified GAN", to simulate drift and determine whether drift exists in the ML model.

Figure 2:
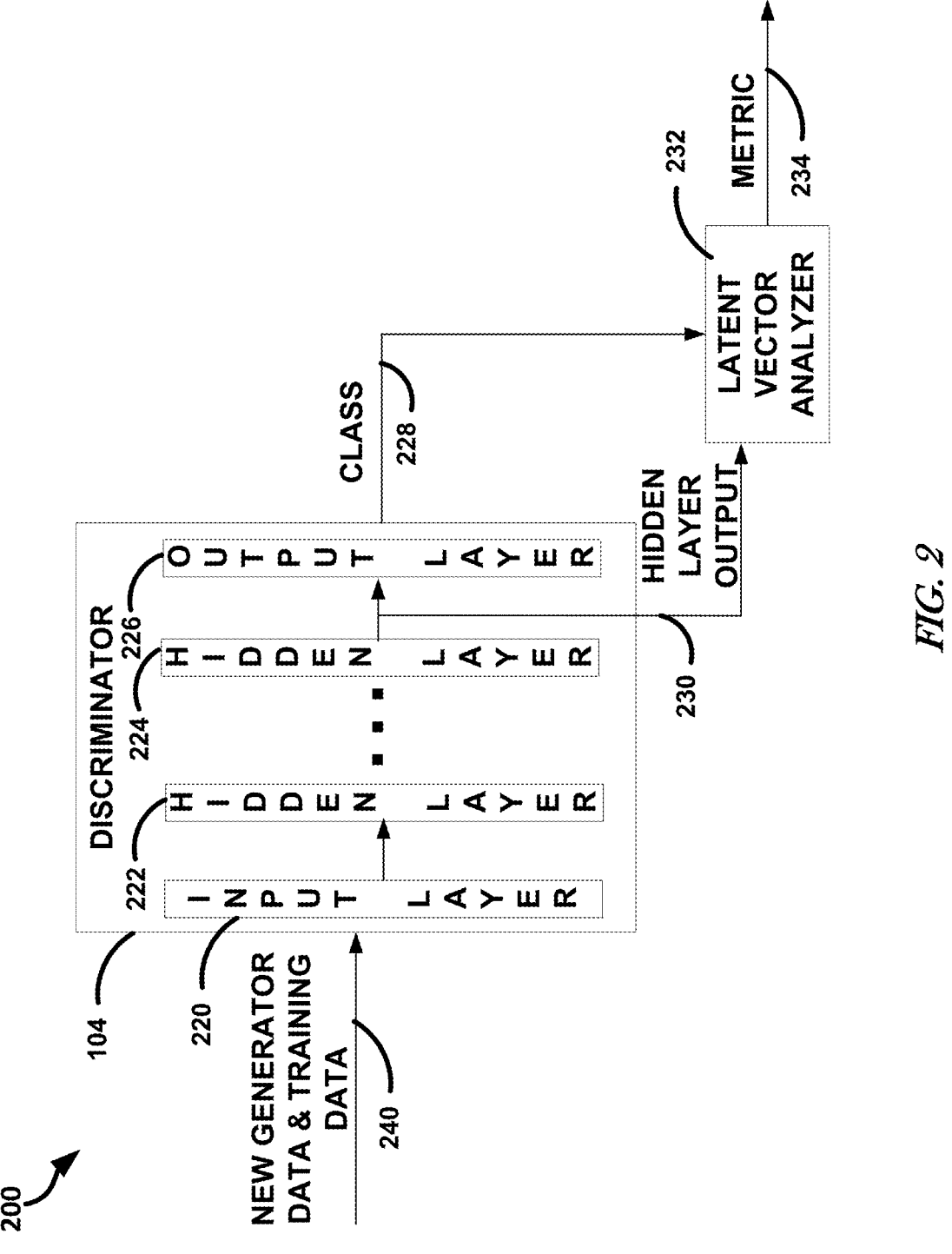
FIG. 2 illustrates, by way of example, a diagram of an embodiment of a modified GAN architecture for quantifying ML model drift analytics.

FIG. 2 illustrates, by way of example, a diagram of an embodiment of a modified GAN architecture 200 for quantifying ML model drift. The architecture 200 as illustrated includes the discriminator network 104 of the GAN architecture, such as that illustrated in FIG. 1, after training. However, the architecture 200 includes no update of the discriminator network 104, has the discriminator network 104 operating to classify new generator data and training data 240, and includes a latent vector analyzer 232 to determine a metric 234 that is used by a drift analyzer 236 to classify drift. New generator data in the modified GAN architecture 200 can include fake data 112 from the generator network 102 to help quantify drift of the discriminator network 104.

Drift in the ML model can be from changes that are design changes to the object, dressing changes (aesthetic changes) to the object, or the like for which the discriminator network 104 may or may not be trained to consider in classification. The change can be made to the object after discriminator network 104 deployment (e.g., between training the discriminator network 104 and testing the drift using the modified GAN architecture 200).

The discriminator network 104 can operate to generate a classification 228 for the fake data 218. The discriminator network 104 as illustrated has a deep neural network (NN) architecture with an input layer 220, hidden layers 222, 224, and an output layer 226. Existence of a hidden layer 222, 224 is typically not visible to an entity operating the model after deployment, thus it is "hidden". However, hidden layer output 230 of one or more hidden layers 222, 224 can be used to analyze whether a model has drifted so as to benefit from additional training.

A latent vector analyzer 232 receives the hidden layer output 230 and the class 228. The latent vector analyzer 232 determines one or more metrics 234 based on the hidden layer output 230. The metrics 234 can include an average of the hidden layer output 230 per class 228. The latent vector analyzer 232 can determine an average for each entry, j, in the feature vectors determined by the discriminator network 104 to be associated with class, c. Assuming three classes and ten entries in the feature vector, thirty averages can be determined.

The metrics 234 can include an average confidence per class. The metrics 234 can include a variance of the hidden layer output 230 per class 228. The latent vector analyzer can determine the variance for each entry, j, in the feature vectors determined by the discriminator network 104 to be associated with class, c. Assuming three classes and ten entries in the feature vector, thirty variances can be determined. These averages and variances can then be used with deployment of the discriminator network 104 to determine whether the discriminator network 104 has experienced drift.

Figure 3:
FIG. 3 illustrates, by way of example, a block diagram of an ML system for model drift detection.

FIG. 3 illustrates, by way of example, a block diagram of an ML system 300 for model drift detection. The ML system 300 includes the discriminator network 104 and a drift analyzer 336. The drift analyzer 336 can determine whether the discriminator network 104, in classifying new data 330 in its deployed environment, is suffering from model drift based on the metrics 234. The average feature vector per class, average confidence per class, variance per class, a different metric, or a combination thereof can indicate whether the discriminator network 104 can benefit from further training to handle the drift. If either (i) the average confidence for a given class is below a first specified threshold, (ii) a difference between the average confidence for a given class is more than a threshold less than a prior average confidence for the given class, (iii) the variance for a given class is above a second specified threshold, or (iv) a difference between the variance for a given class is more than a threshold more than a prior variance for the given class, the drift analyzer 336 can indicate the class 228 for which further training is beneficial on the output 332. If such a drift is detected, the real data 216, fake data 218, other data that represents the drift condition, or a combination thereof can be used to further train the discriminator network 104. The discriminator network 104, after training, can then be re-deployed with confidence that it properly handles the new conditions of its environment.

ML models are widely applicable. Example applications include, but are not limited to, autonomous vehicles, cyber security, medical diagnostics, financial applications, among many others.

Figure 4:
FIG. 4 illustrates, by way of example, a block diagram of an embodiment of a method for ML model drift detection.
Figure 4:
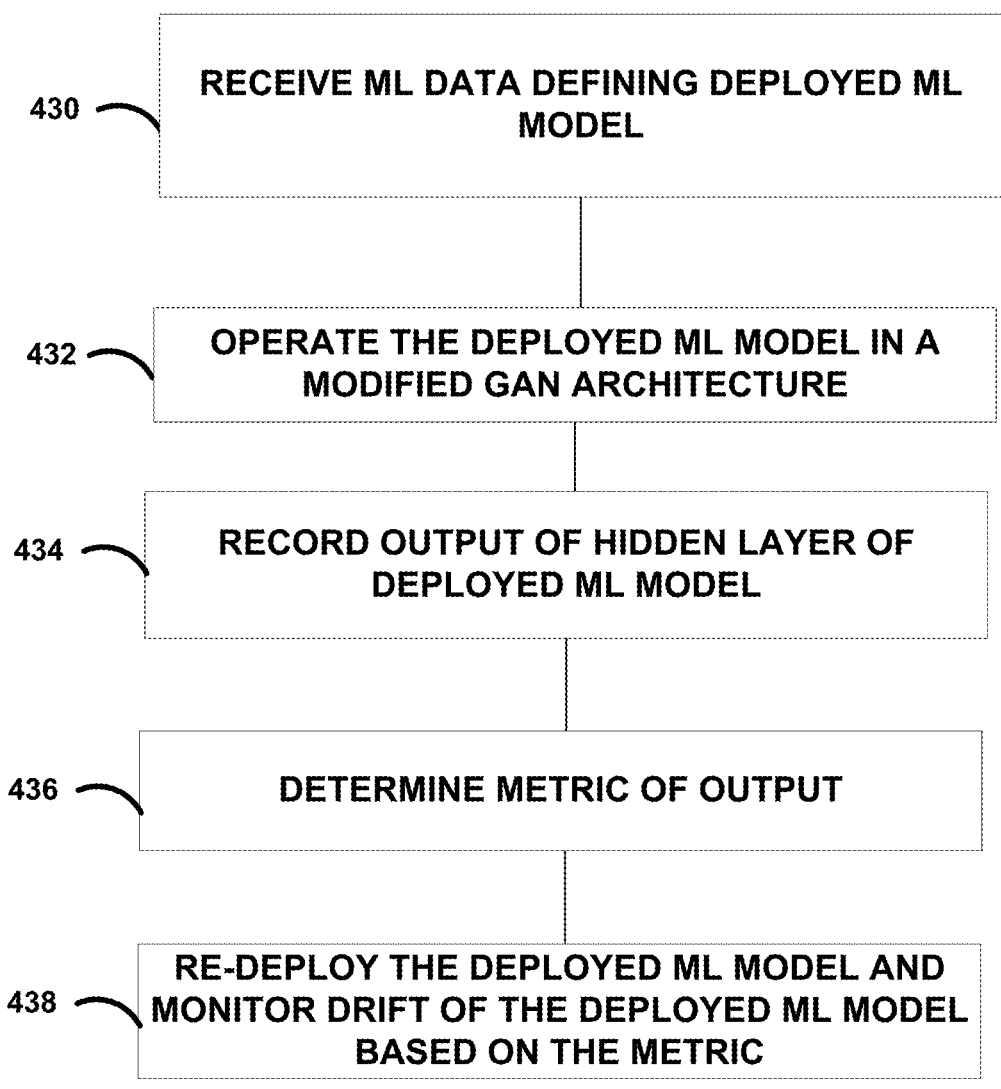

FIG. 4 illustrates, by way of example, a block diagram of an embodiment of a method 400 for ML model drift detection. The method 400 as illustrated includes receiving machine learning (ML) data defining a deployed ML model, at operation 430; operating the deployed ML model in a modified generative adversarial network (GAN) architecture, at operation 432; while operating the deployed ML model, recording output of a hidden layer of the deployed ML model, at operation 434; determining a metric of the output, at operation 436; and re-deploying the deployed ML model and monitoring whether the re-deployed ML model is suffering from ML model drift based on the metric, 438.

The ML data can define a number of layers of neurons, a number of neurons per each layer, and weights for each neuron of the deployed ML model. The method 400 can further include training the deployed ML model based on input used to determine the metric, resulting in an ML model that does not suffer from the ML model drift. The metric can be determined per class that is classified by the deployed ML model. The metric can include one or more of (i) an average confidence for a given class is below a first specified threshold, (ii) a difference between the average confidence for a given class is more than a threshold less than a prior average confidence for the given class, (iii) a variance for a given class is above a second specified threshold, or (iv) a difference between the variance for a given class is more than a threshold more than a prior variance for the given class.

The modified GAN architecture can include fake data, from a generator of an unmodified GAN architecture that includes the discriminator, input to the discriminator and the deployed ML model is used as the discriminator. The modified GAN architecture can include the deployed ML model configured to classify the fake data independent of real data. The modified GAN architecture includes no feedback loops configured to update weights of neurons of the modified GAN architecture.

AI is a field concerned with developing decision-making systems to perform cognitive tasks that have traditionally required a living actor, such as a person. NNs are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 5:
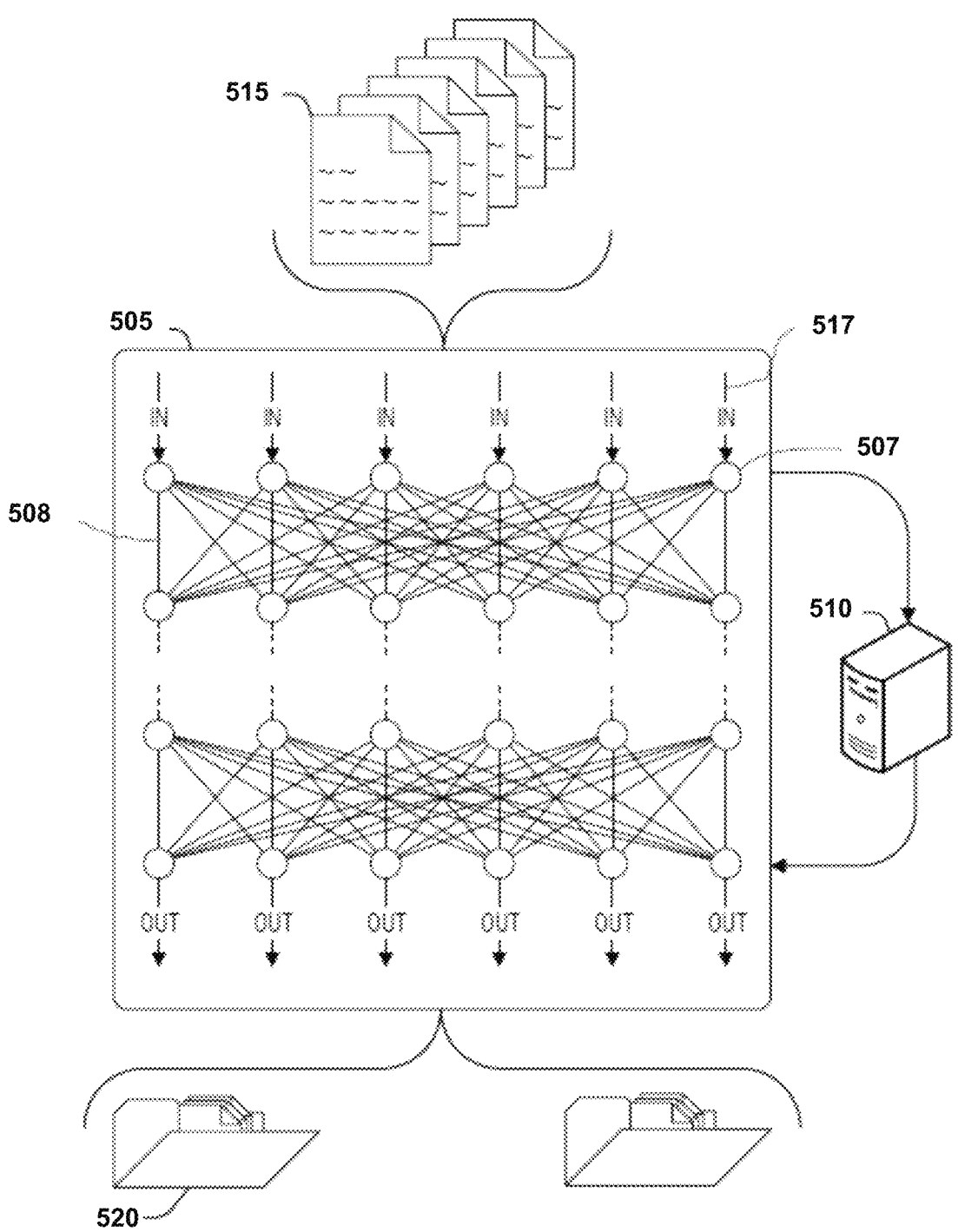
FIG. 5 is a block diagram of an example of an environment including a system for neural network training, according to an embodiment.

FIG. 5 is a block diagram of an example of an environment including a system for neural network training, according to an embodiment. The system can aid in training of a cyber security solution according to one or more embodiments. The system includes an artificial NN (ANN) 505 that is trained using a processing node 510. The processing node 510 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 505, or even different nodes 507 within layers. Thus, a set of processing nodes 510 is arranged to perform the training of the ANN 505.

The set of processing nodes 510 is arranged to receive a training set 515 for the ANN 505. The ANN 505 comprises a set of nodes 507 arranged in layers (illustrated as rows of nodes 507) and a set of inter-node weights 508 (e.g., parameters) between nodes in the set of nodes. In an example, the training set 515 is a subset of a complete training set. Here, the subset may enable processing nodes with limited storage resources to participate in training the ANN 505.

The training data may include multiple numerical values representative of a domain, such as a word, symbol, other part of speech, or the like. Each value of the training or input 517 to be classified once ANN 505 is trained, is provided to a corresponding node 507 in the first layer or input layer of ANN 505. The values propagate through the layers and are changed by the objective function.

As noted above, the set of processing nodes is arranged to train the neural network to create a trained neural network. Once trained, data input into the ANN will produce valid classifications 520 (e.g., the input data 517 will be assigned into categories), for example. The training performed by the set of processing nodes 507 is iterative. In an example, each iteration of the training the neural network is performed independently between layers of the ANN 505. Thus, two distinct layers may be processed in parallel by different members of the set of processing nodes. In an example, different layers of the ANN 505 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 507 (e.g., neurons) are trained independently. In an example, the nodes are trained on different hardware.

Figure 6:
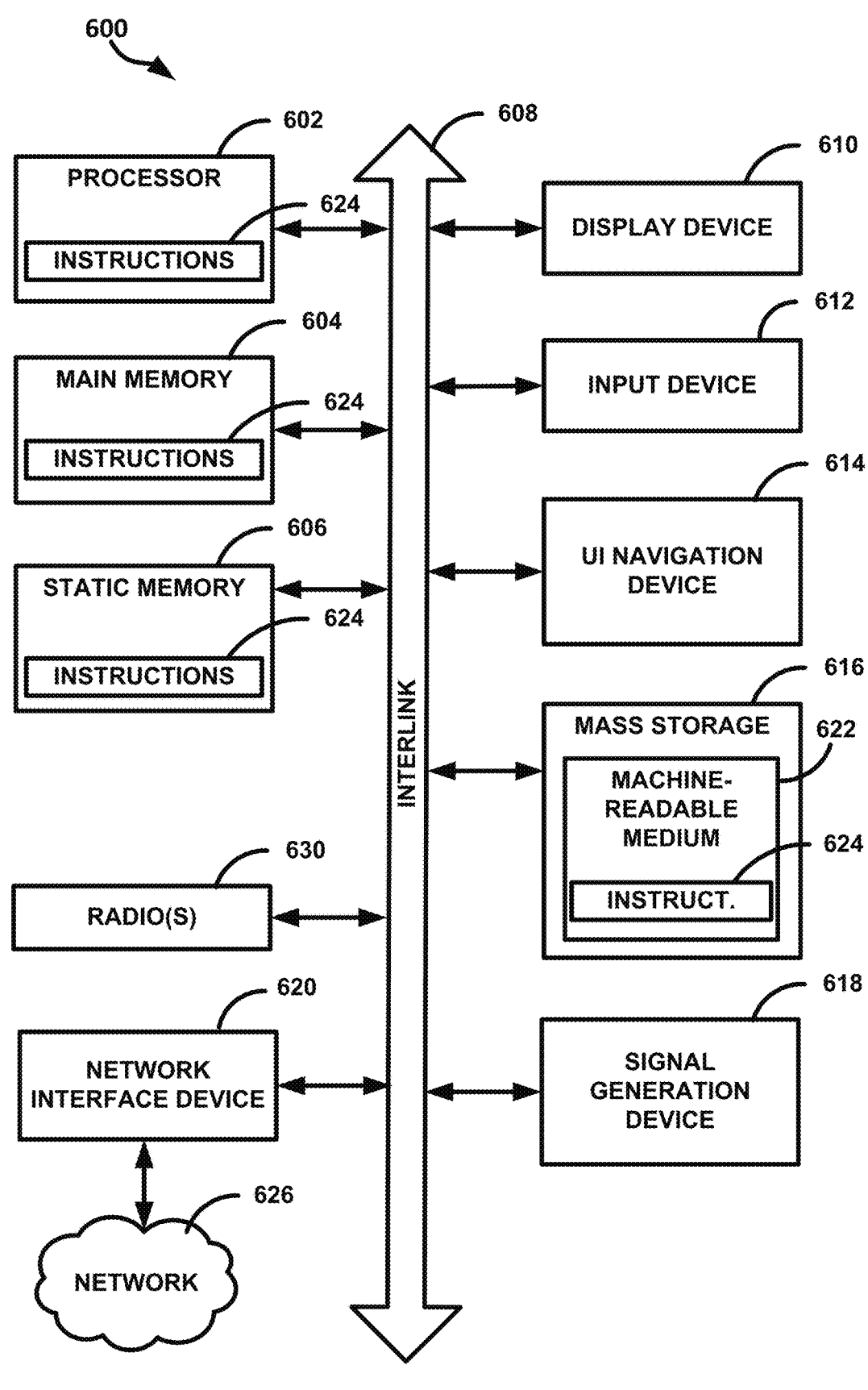
FIG. 6 illustrates, by way of example, a block diagram of an embodiment of a machine in the example form of a computer system within which instructions, for causing the machine to perform any one or more of the methodologies discussed herein, may be executed.

FIG. 6 illustrates, by way of example, a block diagram of an embodiment of a machine in the example form of a computer system 600 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a mass storage unit 616, a signal generation device 618 (e.g., a speaker), a network interface device 620, and a radio 630 such as Bluetooth, WWAN, WLAN, and NFC, permitting the application of security controls on such protocols.

The mass storage unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes a device comprising at least one memory including instructions stored thereon, and processing circuitry configured to execute the instructions, the instructions, when executed, cause the processing circuitry to perform operations comprising receiving machine learning (ML) data defining a number of layers of neurons, a number of neurons per each layer, and weights for each neuron of a deployed ML model, operating the deployed ML model in a modified generative adversarial network (GAN) architecture, while operating the deployed ML model, recording output of a hidden layer of the deployed ML model, determining a metric of the output, and re-deploying the ML model and monitoring whether the re-deployed ML model is suffering from ML model drift based on the metric.

In Example 2, Example 1 can further include, wherein the operations further comprise training the deployed ML model based on input used to determine the metric, resulting in an ML model that does not suffer from the ML model drift.

In Example 3, at least one of Examples 1-2 can further include, wherein the metric is determined per class that is classified by the deployed ML model.

In Example 4, Example 3 can further include, wherein the metric includes one or more of (i) an average confidence for a given class is below a first specified threshold, (ii) a difference between the average confidence for a given class is more than a threshold less than a prior average confidence for the given class, (iii) a variance for a given class is above a second specified threshold, or (iv) a difference between the variance for a given class is more than a threshold more than a prior variance for the given class.

In Example 5, at least one of Examples 1-4 can further include, wherein the modified GAN architecture includes fake data, from a generator of an unmodified GAN architecture that includes the discriminator, input to the discriminator.

In Example 6, Example 5 can further include, wherein the modified GAN architecture includes the deployed ML model configured to classify the fake data independent of real data.

In Example 7, Example 6 can further include, wherein the modified GAN architecture includes no feedback loops configured to update weights of neurons of the modified GAN architecture.

Example 8 includes a non-transitory machine-readable medium including instructions that, when executed by a machine, cause the machine to perform operations of the processing circuitry of at least one of Examples 1-7.

Example 9 includes a method including the operations of the processing circuitry of at least one of Examples 1-7.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device comprising:

at least one memory including instructions stored thereon; and processing circuitry configured to execute the instructions, the instructions, when executed, cause the processing circuitry to perform operations comprising:

receiving machine learning (ML) data defining a number of layers of neurons, a number of neurons per each layer, and weights for each neuron of a deployed ML model;

operating the deployed ML model in a modified generative adversarial network (GAN) architecture, the modified GAN architecture includes fake data, from a generator of an unmodified GAN architecture that includes a discriminator, input to the deployed ML model, the modified GAN architecture includes no feedback loops configured to update weights of neurons of the modified GAN architecture;

while operating the deployed ML model, recording output of a hidden layer of the deployed ML model;

determining a metric of the output; and re-deploying the ML model and monitoring whether the re-deployed ML model is suffering from ML model drift based on the metric.

2. The device of claim 1, wherein the operations further comprise training the deployed ML model based on input used to determine the metric, resulting in an ML model that does not suffer from the ML model drift.

3. The device of claim 1, wherein the metric is determined per class that is classified by the deployed ML model.

4. The device of claim 3, wherein the metric includes one or more of (i) an average confidence for a given class is below a first specified threshold, (ii) a difference between the average confidence for a given class is more than a threshold less than a prior average confidence for the given class, (iii) a variance for a given class is above a second specified threshold, or (iv) a difference between the variance for a given class is more than a threshold more than a prior variance for the given class.

5. The device of claim 1, wherein the modified GAN architecture includes the deployed ML model configured to classify the fake data independent of real data.

6. A non-transitory machine-readable medium including instructions that, when executed by a machine, cause the machine to perform operations comprising:

receiving machine learning (ML) data defining a number of layers of neurons, a number of neurons per each layer, and weights for each neuron of a deployed ML model;

operating the deployed ML model in a modified generative adversarial network (GAN) architecture, the modified GAN architecture includes fake data, from a generator of an unmodified GAN architecture that includes a discriminator, input to the deployed ML model, the modified GAN architecture includes no feedback loops configured to update weights of neurons of the modified GAN architecture;

while operating the deployed ML model, recording output of a hidden layer of the deployed ML model;

determining a metric of the output; and re-deploying the deployed ML model and monitoring whether the re-deployed ML model is suffering from ML model drift based on the metric.

7. The non-transitory machine-readable medium of claim 6, wherein the operations further comprise training the deployed ML model based on input used to determine the metric, resulting in an ML model that does not suffer from the ML model drift.

8. The non-transitory machine-readable medium of claim 6, wherein the metric is determined per class that is classified by the deployed ML model.

9. The non-transitory machine-readable medium of claim 8, wherein the metric includes one or more of (i) an average confidence for a given class is below a first specified threshold, (ii) a difference between the average confidence for a given class is more than a threshold less than a prior average confidence for the given class, (iii) a variance for a given class is above a second specified threshold, or (iv) a difference between the variance for a given class is more than a threshold more than a prior variance for the given class.

10. The non-transitory machine-readable medium of claim 6, wherein the modified GAN architecture includes the deployed ML model configured to classify the fake data independent of real data.

11. A method comprising:

receiving machine learning (ML) data defining a number of layers of neurons, a number of neurons per each layer, and weights for each neuron of a deployed ML model;

operating the deployed ML model in a modified generative adversarial network (GAN) architecture, the modified GAN architecture includes fake data, from a generator of an unmodified GAN architecture that includes a discriminator, input to the deployed ML model, the modified GAN architecture includes no feedback loops configured to update weights of neurons of the modified GAN architecture;

while operating the deployed ML model, recording output of a hidden layer of the deployed ML model;

determining a metric of the output; and re-deploying the deployed ML model and monitoring whether the re-deployed ML model is suffering from ML model drift based on the metric.

12. The method of claim 11, further comprising training the deployed ML model based on input used to determine the metric, resulting in an ML model that does not suffer from the ML model drift.

13. The method of claim 11, wherein the metric is determined per class that is classified by the deployed ML model.

14. The method of claim 13, wherein the metric includes one or more of (i) an average confidence for a given class is below a first specified threshold, (ii) a difference between the average confidence for a given class is more than a threshold less than a prior average confidence for the given class, (iii) a variance for a given class is above a second specified threshold, or (iv) a difference between the variance for a given class is more than a threshold more than a prior variance for the given class.

15. The method of claim 11, wherein the modified GAN architecture includes the deployed ML model configured to classify the fake data independent of real data.

* * * * *